Aug. 20, 1946.   G. CLAUSING   2,405,941
AUTOMATIC HEEL TURNING MACHINE
Filed Oct. 19, 1943   9 Sheets-Sheet 1

INVENTOR
George Clausing
BY

Aug. 20, 1946.          G. CLAUSING          2,405,941
AUTOMATIC HEEL TURNING MACHINE
Filed Oct. 19, 1943          9 Sheets-Sheet 3

INVENTOR.
George Clausing
BY

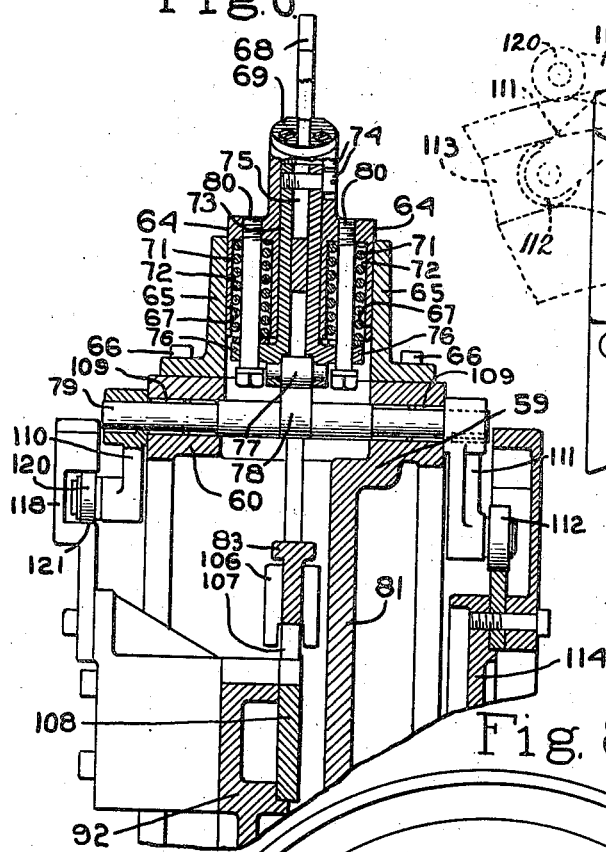
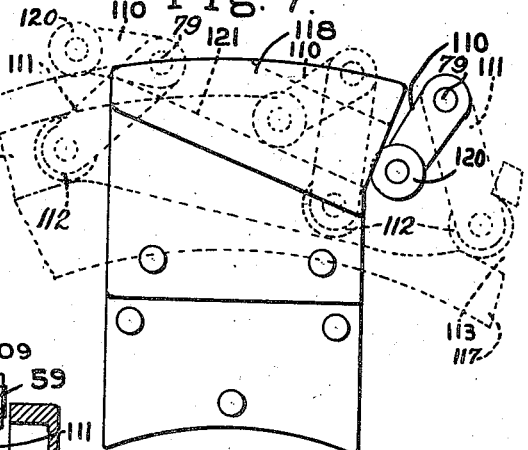
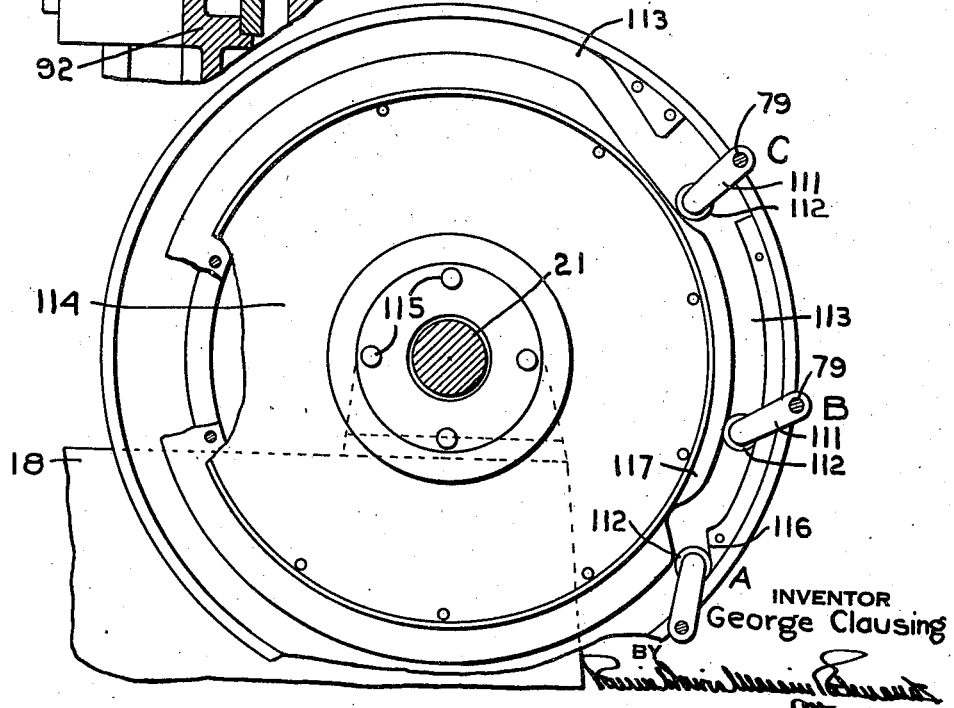

INVENTOR.
George Clausing

Aug. 20, 1946.　　　　G. CLAUSING　　　　2,405,941
AUTOMATIC HEEL TURNING MACHINE
Filed Oct. 19, 1943　　　　9 Sheets-Sheet 6

INVENTOR.
George Clausing

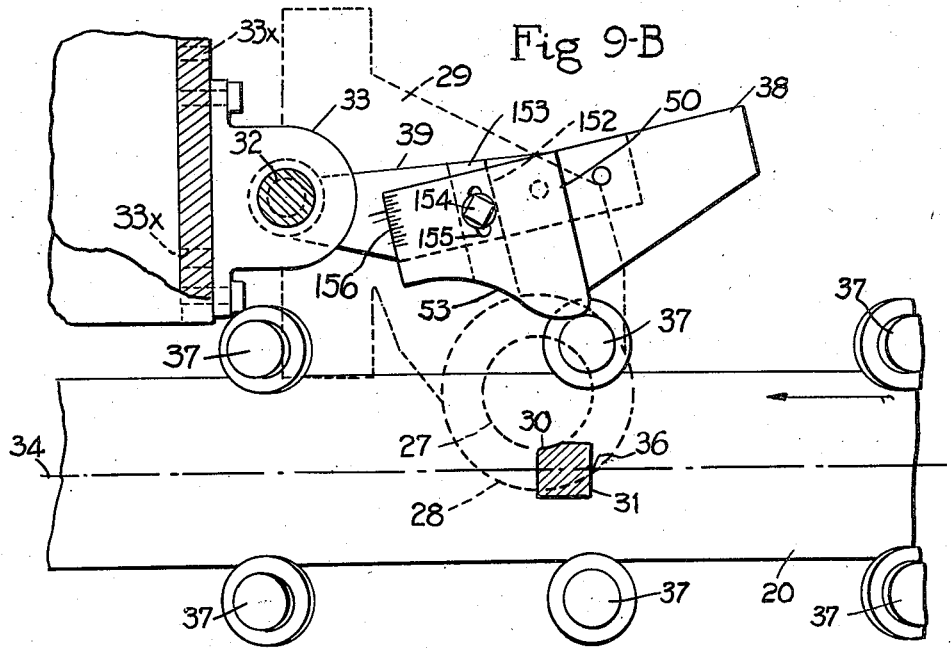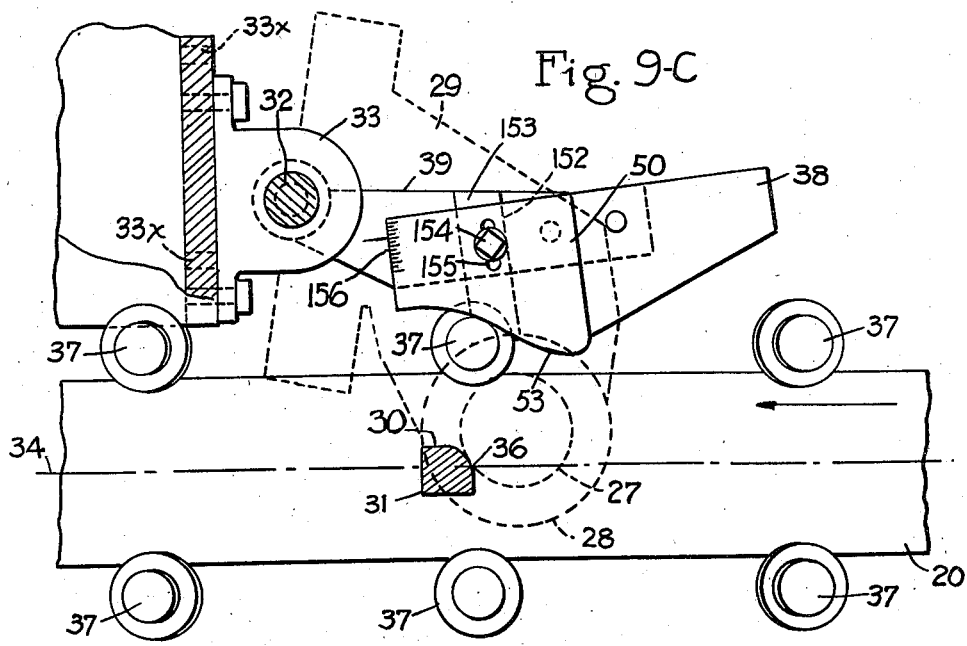

INVENTOR.
George Clausing
BY

Aug. 20, 1946.                G. CLAUSING                2,405,941
                    AUTOMATIC HEEL TURNING MACHINE
                      Filed Oct. 19, 1943        9 Sheets-Sheet 9

INVENTOR.
George Clausing
BY

Patented Aug. 20, 1946

2,405,941

UNITED STATES PATENT OFFICE 2,405,941

AUTOMATIC HEEL TURNING MACHINE

George Clausing, Portsmouth, Ohio, assignor to Vulcan Corporation, Portsmouth, Ohio, a corporation of Ohio Application October 19, 1943, Serial No. 506,871

29 Claims. (Cl. 12—87)

This invention relates to an apparatus for automatically forming a plurality of identically shaped objects by means of a cutting operation executed by a rapidly rotated formed cutter blade. More particularly it is directed to a machine for shaping heels for shoes.

The operation performed by the apparatus is known in the heel making art as heel turning. Specifically the operation is that which results in imparting to the heel its general external configuration by shaping those areas thereof that extend along its sides and back.

Not only is it the present practice but it has been the practice of heel makers for many years to perform the turning operation upon a hand operated machine whose chief characteristics are those of a standard spindle shaper such as that used generally in the wood working art. The main difference being that the commonly used heel turning machine is provided with a mechanism for holding a heel block and enabling an operator to present the block to the cutter under the guidance of a form. To produce a quantity of heels of satisfactory quality upon such a machine a skilled operator must be employed. The operator moreover was able to turn only a limited number of heels in a working day. His capacity was limited by the natural factor of fatigue which also seriously interfered with the production of uniformally high quality in his work.

The present invention transforms the turning operation from a relatively slow inaccurate process to a rapid mechanically precise operation independent of the human factors above mentioned. The apparatus consists essentially of a base or supporting element upon which a carrier member is movable mounted. The carrier member has a plurality of heel block holding jacks mounted thereon arranged to move rough heel blocks into cutting relation with rapidly rotated cutter blades to execute the forming operation. The cutter blades are mounted upon a spindle which desirably may have an electric motor direct connected thereto. The cutter spindle is received in a swinging bracket pivoted upon the base member in such position that the cutters may move into the path of travel of the heel blocks as they are fed along by the carrier member. The brackets and cutters are swung toward the carrier by a suitable means such as a weight and cable device. The inward movement of the cutter during the turning operation is positively controlled by a cam and follower mechanism designed accurately to execute a predetermined heel contour.

There are two cutter manipulating assemblies as above described of like construction one of which executes the desired cut along one side of the heel from its breast corner rearwardly to the heel back line. The other mechanism is disposed upon the opposite side of the carrier member and functions to shape the other side of the heel. Some types of heels such as those which the heel manufacturer considers to be a low heel may be made upon the machine as above described. To produce other types of heels for example those considered to be high heels further manipulation of the relative movements between the cutters and the block must be introduced to obtain the desired heel form. To execute this further manipulation, the present invention introduces an additional controlled motion of the block itself with respect to the carrier member during the cutting operation. This additional movement of the heel block is made possible by an especially constructed block holding jack in which a block clamping member is relatively movable with respect to the jack as a whole.

The motion imparted to the block takes place in a plane parallel to the heightwise heel axis and to the direction of its travel. The motion imparted to the block is of the nature of a rocking or oscillating movement derived from a cam and follower device so arranged that the movement of the carrier imparts a predetermined motion to a member movable upon the carrier which in turn successively transmits the movement to the blocks through a mechanical connection to the block clamping elements of each jack during the heel shaping operation.

Means are provided for releasing the processed heels from the jacks and maintaining succeeding vacated jacks in condition to again receive an uncut block. An important feature of the invention which will be described in detail hereinafter resides in the especially designed arrangement of the elements which move the cutter into cutting relation with the heel block and cause it to follow around the heel to the back line thereof where the cutting action is discontinued. The pivot upon which the cutter is mounted is so positioned with respect to the path of travel of the blocks that the linear speed of the progress of the cut along the block at the cutting line is held within predetermined limits. Such speed normally would be substantially constant or it may be desirable to gradually decrease the speed from the side of the heel around the corner of the block and attaining minimum speed at the back line.

To present a better understanding of the invention a particular embodiment thereof will now be described in connection with the accompanying drawings in which:

Fig. 6 is a cross section on line 6—6 of Fig. 1 showing in enlarged detail the construction and operation of one of the jacks.

Fig. 7 is a detailed view illustrating the means for applying clamping pressure to retain the heel blocks in their jacks.

Fig. 8 is an illustration of the cam system employed for releasing the clamping pressure from the heel blocks after the turning operation has been executed.

Figure 9:
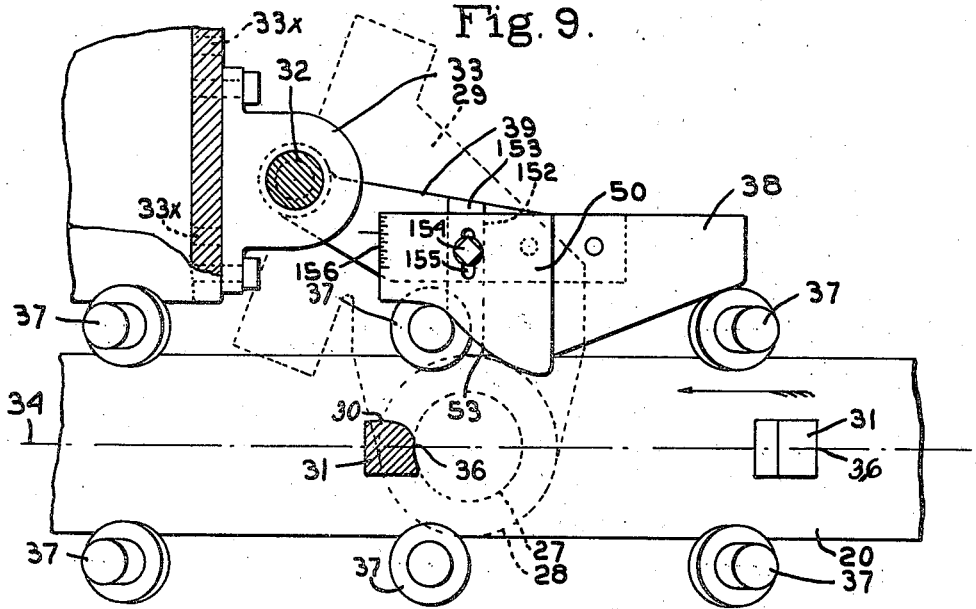
Fig. 9 is a plan view of the elements shown in Fig. 2 and illustrates the relationship between the cam and follower which acts to determine the heel shape.

Figs. 9—A, 9—B, and 9—C are views similar to that of Fig. 9 showing various positions of the cutter, cam and follower at various stages of the cycle involved in cutting a heel block.

Figure 10:
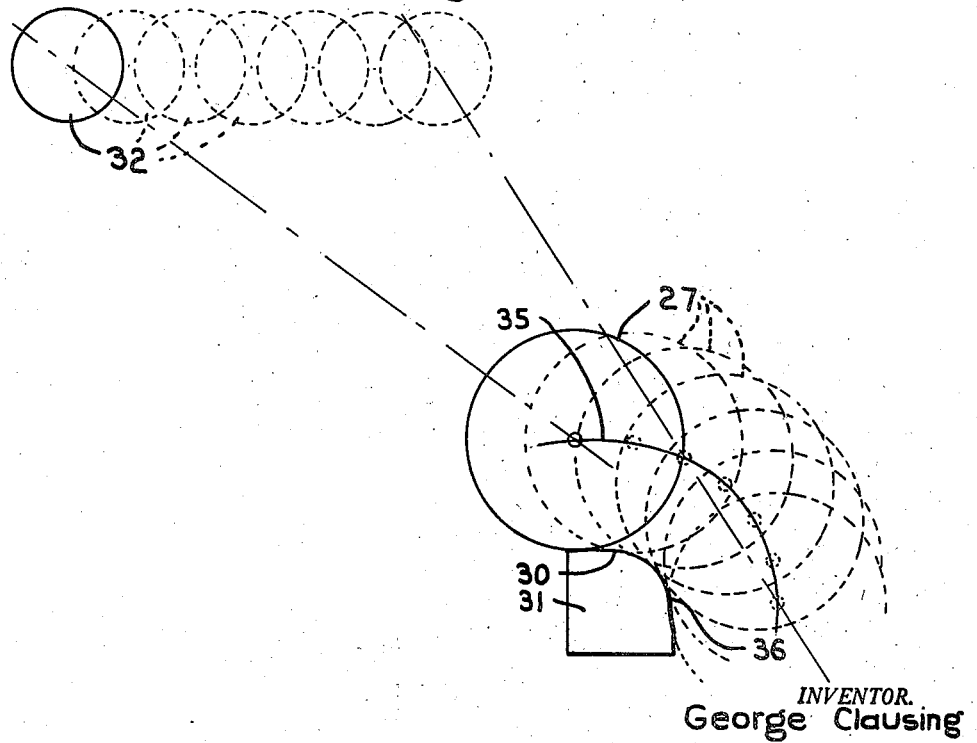
Figure 9A:
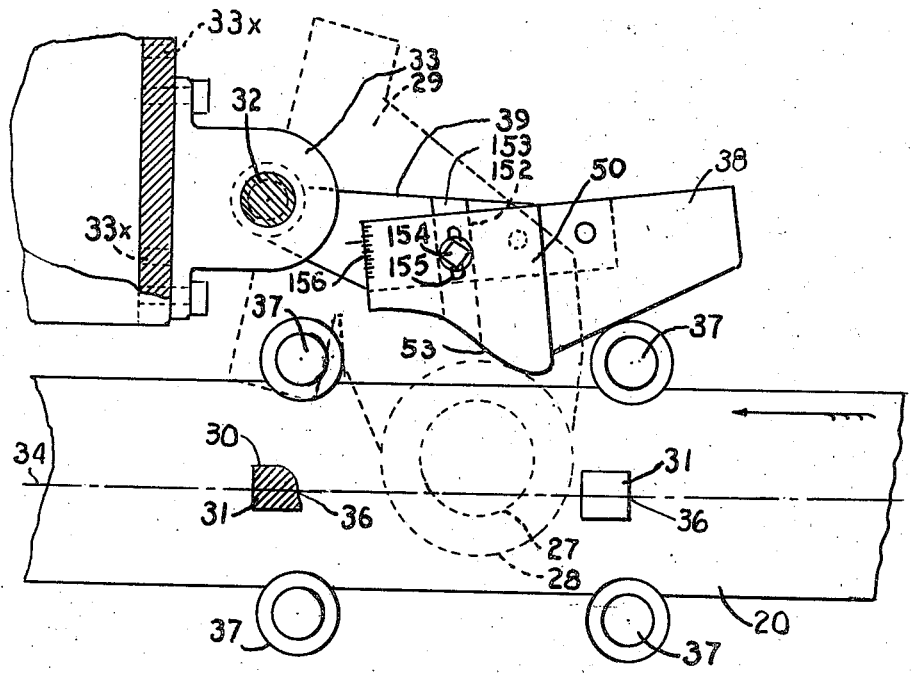

Fig. 10 is a diagrammatic view illustrating the relative path of movement of the cutter and cutter arm with respect to the heel block during the turning operation.

Figure 11:
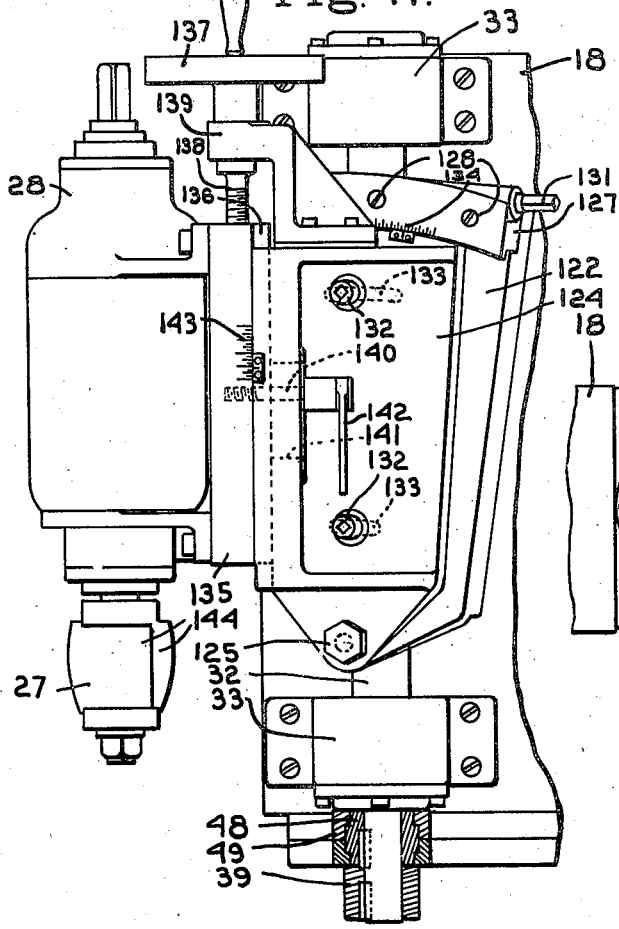

Fig. 11 is a general view of the motor and cutter unit supporting bracket.

Figure 12:
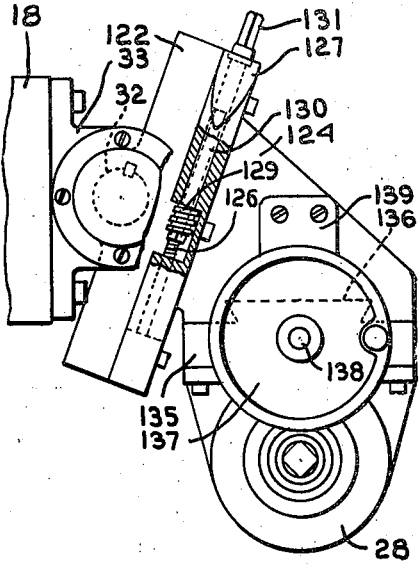

Fig. 12 is a plan view of the elements shown in Fig. 11 with a portion shown in section to illustrate an angular adjustment device.

Figure 13:
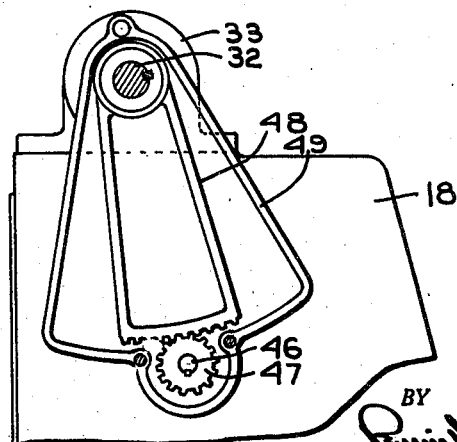

Fig. 13 is a detailed view illustrating the driving means for swinging the cutter and motor supporting arm.

Figure 14:
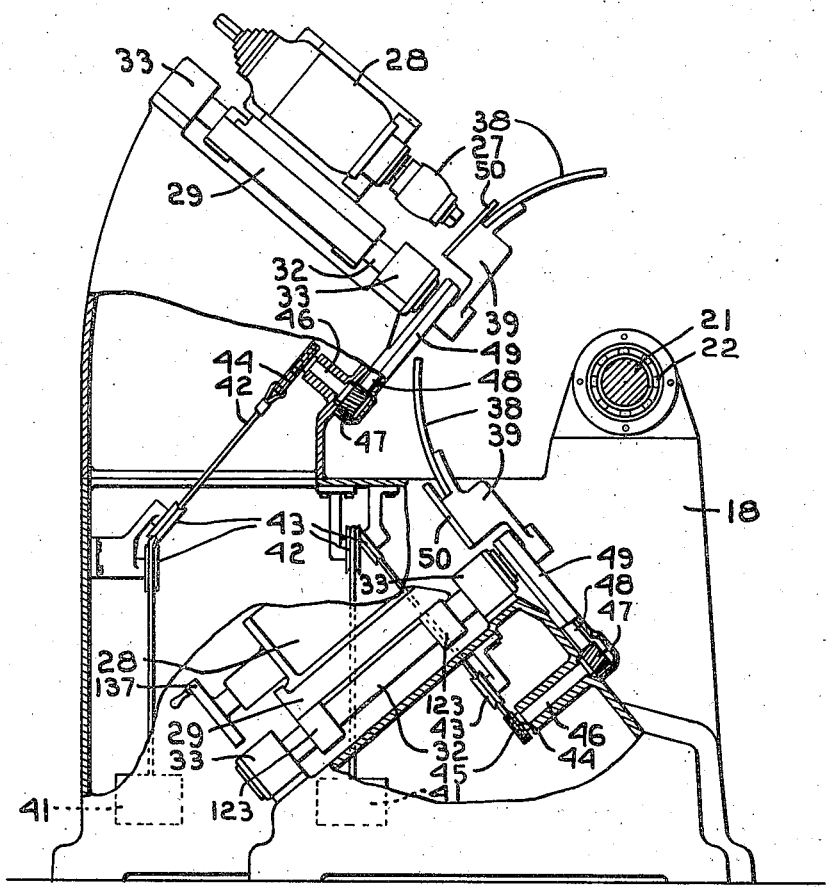

Fig. 14 is a general view of the machine frame broken away to show the mechanism employed to swing the motor and cutter brackets into operative position.

Figure 15:
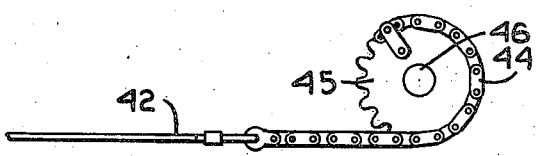

Fig. 15 is a detailed illustration showing the chain and sprocket connection between the operating weights and the pinion shaft for the motor and cutter bracket drive.

It is important to note in connection with the following description that the mechanism embodied in the apparatus presented is highly efficient and rapid in operation and moreover presents a design having basic simplicity which insures a long uninterrupted life of consistently accurate operation.

The operation of turning heels is highly critical and precise in character and as above suggested the operation has required the services of highly skilled operators who use a converted type of spindle shaper wherein the heel blocks are secured in a pivoted jack and are fed to the cutters by hand. The present invention eliminates the inaccuracies and lack of high volume productivity of the present method.

Briefly the operation of turning a heel involves the execution of two similar operations. One-half of the heel is first completed by feeding a rough block into cutting engagement with a rotating cutter. The cut is initiated at a corner of the heel breast, proceeds along one side of the heel and half way around the back of the heel ending at a line upon a central longitudinal plane through the heel known as the back line. A similar procedure is executed upon the other side of the heel block by another cutter to complete the turning operation. The cutters are shaped to produce the desired heel profile contour while a form plate or cam acts to control the relative position of the cutter and the block during the cutting operation thereby to produce a predetermined heel seat outline.

Figure 3:
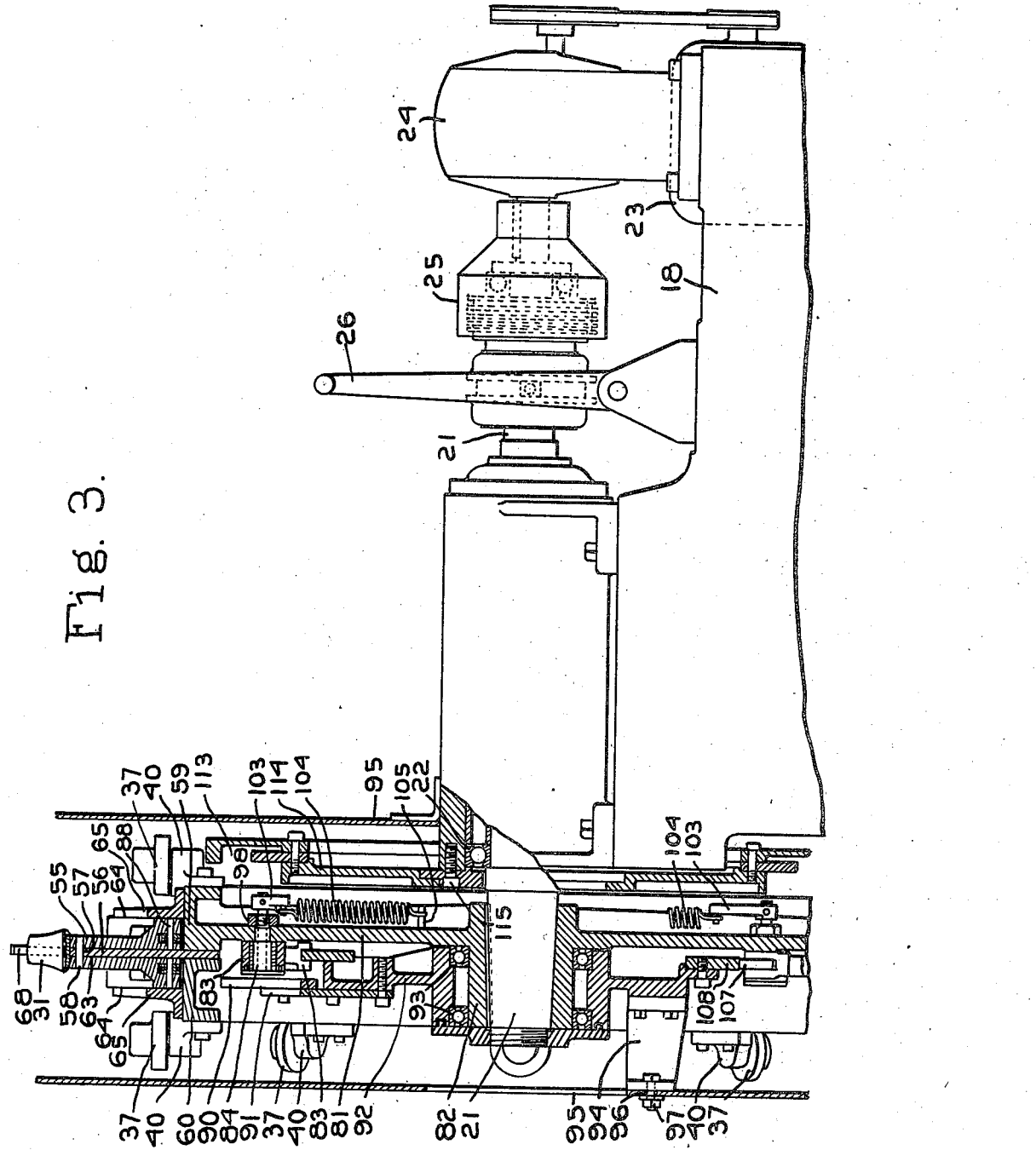
Fig. 3 is a partial side view of the apparatus on the line 3—3 of Fig. 1 showing the conveyor wheel in cross section.

The preferred form of the invention illustrated is provided with a rigid supporting frame 18 upon which all of its elements are mounted. A conveyor or carrier is provided for automatically feeding heel blocks into position to be processed. The carrier may be of any suitable construction. A desirable form of carrier is shown wherein a plurality of heel jacks 19 are mounted upon the periphery of a circular carrier wheel 20. The wheel 20, as shown in Fig. 3 is mounted upon the end of a rigid shaft 21 horizontally mounted upon the machine frame 18. Desirably the shaft is supported upon anti-fraction bearings 22.

While the machine is in operation the carrier is driven constantly at uniform speed determined by the number of heel blocks the operator is capable of feeding to the jacks. Any suitable means may be used to drive the wheel. One such means of driving the wheel is shown in Fig. 3, wherein the shaft 21 is rotated by motor 23 through the medium of a speed reducing unit 24. The connection from the unit 24 to the shaft 21 is made through a friction clutch 25 having an operating handle 26 by means of which the wheel 20 may be started and stopped independently of the driving motor.

Figure 1:
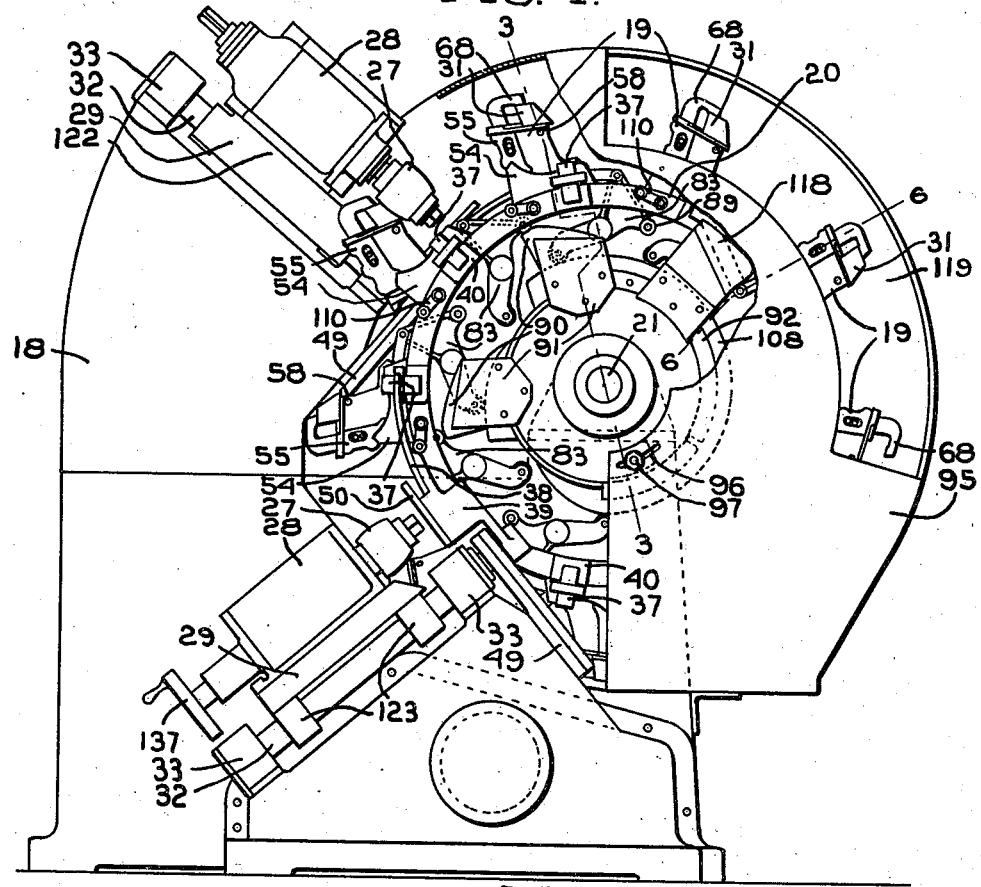
Fig. 1 is a front elevation of the apparatus.
Figure 2:
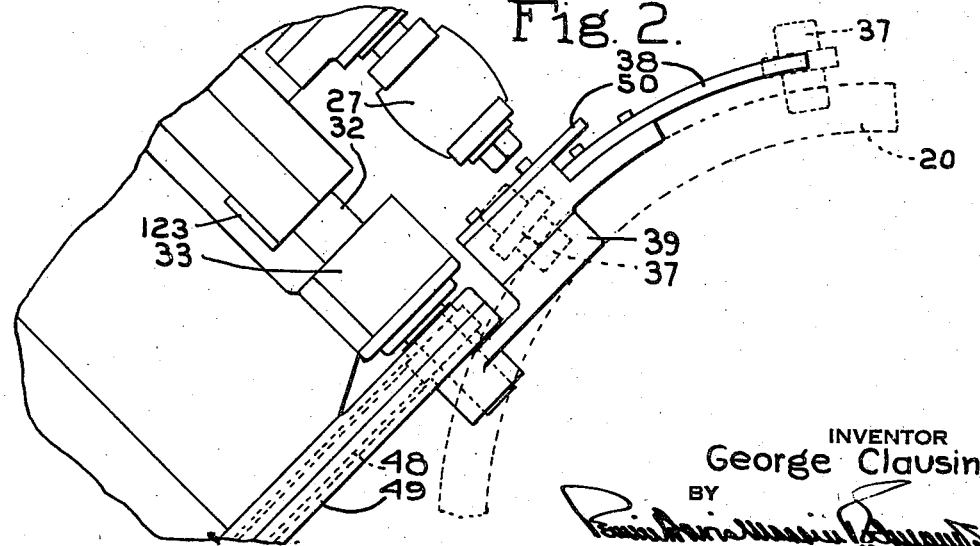
Fig. 2 is an enlarged detailed view of the cam device employed to control the bodily movement of the cutters.

There are two power driven cutter assemblies each mounted upon opposite sides of the plane of the carrier. A desirable means for driving the cutters is illustrated in Fig. 1 wherein the cutter heads 27 are mounted directly upon the spindles of their driving motors 28. The motors and cutters are adjustly mounted upon supporting brackets 29. The cutters and their driving motors are so mounted upon the machine frame that their axes are substantially radial with respect to the axis of the shaft 21. Each cutter is spaced angularly about the shaft axis at an angle at least as great as the angle of separation between adjacent heel jacks 19.

To perform the turning operation the cutters 27 must be fed inward toward the carrier 20. To obtain this motion any suitable means may be employed. However, the direction of travel and the character of this inward motion of the cutter must be controlled to properly execute the turning operation. The present invention provides a very effective and positive means for co-relating the motion of the cutter with the travel of the heel block throughout the cutting operation. The mechanism for obtaining this desirable co-action between cutter and block is an important feature of the invention. To obtain maximum productivity and high quality of product the linear speed of the cut as it progresses along the line of cut 30 upon the block 31 as shown in Fig. 10, must be regulated. It has been found that a too rapid traverse of the cutter along the back surface of the block where the cutter is cutting across the wood grain and removing a relatively large voltime of wood as the corner of the block is removed, causes a poor quality of workmanship on the heel. The severity of such a cut over-loads the driving motor and imposes too great a cutting pressure upon the heel block. These and other abnormal conditions arising out of an excessively severe cut causes vibration and springing of the parts which result in an inaccurate and roughly cut surface.

In the attempts which have heretofore been made to produce a machine of the type herein presented no satisfactory control of the relative motion between the cutter and block has been devised.

The speed and character of the translational movement of the cutter as it progresses along the heel block in the present invention is determined by two factors. First the peripheral speed of the carrier wheel 20 and secondly the inward travel of the cutter head. The inward swing of the heel curve complicates the control of the movement of the cutter along the line 30 representing the contour of the heel seat as shown in Fig. 10. To produce an efficient result one or the other or both of these factors must be subjected to a control of predetermined character. For example, without such control assuming the peripheral speed of the carrier were maintained constantly uniform and the cutter was permitted to move directly inward at right angles to the path of the blocks in the jacks, the speed of the cut at the side of the heel would be normal, but at the corner of the block and at the back of the heel the inward travel of the cutter would of necessity be so excessively rapid as to be impractical for reasons given above.

In view of the fact that in a high volume production machine it is highly desirable to operate the carrier uninterruptedly and at uniform speed, the present invention maintains the movement of the carrier uniform and introduces the necessary control to the inward motion of the cutter head. A satisfactory regulation of the rate of travel of the cutter along the cutting line 30 calls for maintaining the rate of travel substantially uniform throughout the cut or for a decrease in rate at the back of the heel. Any suitable means may be employed to obtain control of movement of the cutter. A very ingenious and effective means is shown herein. The motor brackets 29 are pivotally mounted upon the machine frame upon shafts 32 disposed substantially parallel to the axis of the cutters and at a substantial distance away from the plane in which the heel blocks 31 move. The shafts are supported in bearings 33 fixed upon the machine frame. The position of the shafts 32 as shown in Fig. 9 is such that a line drawn between the axis of the shafts and the axis of the cutters during the cutting operation lies at an angle between 30° and 60° with respect to the plane 34 in which the blocks travel. Fig. 10 shows this angular relationship and also the fact that the angle increases as the cutting operation on a particular heel block proceeds.

Referring to Fig. 10, the position and path of travel of the elements is diagrammatically illustrated. To more clearly show the movement of the parts in this diagram the block is shown stationary and the cutter supporting shaft 32 is shown as if it were moving by a series of dotted positions. Also the movement of the cutter 27 is illustrated by a series of dotted positions, successive positions of the cutter corresponding to successive relative positions of the shaft 32 as shown by successive dotted circles. The operational result is the same regardless of which of the elements moves. The cumulative effect of the complete operation is illustrated by the outline of the cut upon the block 31 represented by the line 30. The circles representing successive positions of the shaft 32 are equally spaced representing uniform rate of travel. By noting the spacing between corresponding positions of the axis of the cutter which falls on the line 35, it will be noted that the rate of travel of the cutter axis decreases slightly around the curve. At the completion of the cutting operation of one cutter mechanism, the other mechanism upon the other side of the carrier then goes into action and completes the turning operation upon the other side of the heel block in the same manner. To decrease the speed of travel of the cutter along the heel block toward the rear portion of the heel, the angle between the plane 34 and the line drawn through the axis of the shaft 32 and the cutter axis may be increased by moving the shaft 32 outward from the carrier. This may be done in any manner as by shifting the position of the screws which hold the bearing members 33 into new positions 33X (Fig. 9).

The setting of the bearing members 33 in the position shown in Figs. 9, 9—A, 9—B and 9—C, or in the position 33x, predetermines the rate of travel of the cutter 27 along the curved and back portion of the heel block 31, assuming a given distance between the axes of the cutter and shaft 32 and that the block 31 moves at a constant predetermined rate. The turning operation is effected as a heel block 31 advances to the left, the cutter being at the successive positions around the block 31 at equal intervals of time, as shown in Fig. 10. As the cutter moves around the block, it begins to follow the block, thus increasing the angle of the line drawn through the axes of the cutter and shaft 32 with respect to the path of movement of the block 31, as clearly shown in Fig. 10. In this figure of the drawings, the successive dotted circles of the shaft 32 represent equal time intervals, and the same is true of the successive circles 27 representing the cutter. The distance traveled by the cutter along the curved line 30 in each of these successive intervals may be determined approximately from the distance between corresponding points on the circles along the line 30, from which it will be apparent that the rate of travel of the cutter around the curve of the line 30 and along the back of the block 31 to the back line 36, is somewhat less than that along the upper portion of the line 30, which is in a plane substantially parallel to the plane of the line of travel of the block 31. If the shaft 32 were moved nearer the line 34 (Fig. 9) less time would be available for cutting the curved and rear portion of the heel block than in the positions shown in Figs. 9 and 10.

The means employed to impart the desired seat outline to the heel as represented by the line 30 is best shown in Figs. 9, 9—A, 9—B and 9—C. To more clearly illustrate the mechanism only the main elements are shown. Inasmuch as the elements for forming both sides of the heel are of identical construction only one mechanism will be described. The motor and cutter bracket 29 and the cutter 27 are shown in dotted lines. In the position of the parts illustrated in Fig. 9 the cutter has completed its operation and further movement of the carrier 29 causes the cutter to be withdrawn to the outer portion of the cutting zone by reason of engagement of the roll 37 with the cam 38. The cam 38 is rigidly secured to a cam supporting arm 39 rigidly secured upon the lower end of the shaft 32. The bracket 29 is keyed to the shaft 32 with the result that movement of the arm 39 moves the cutter and bracket.

Follower rolls 37, as shown in Figs. 1 and 3, are secured upon opposite sides of the carrier 20 at its periphery. A pair of these rolls are provided for each heel jack and are rotatably received upon supporting members 40 rigidly secured to the carrier 20. The rolls are accurately positioned about the periphery of the carrier at the same angular intervals as that of the heel jacks.

Any suitable means may be provided for supplying the motive power to move the cutter heads into cutting relation with the blocks and to maintain the controlling cam in engagement with the follower rolls 37. Desirably such means should exert a resilient force. An efficient arrangement is illustrated in Figs. 14 and 15, in which inertia means are provided for obtaining the necessary power. A weight 41 is provided for each cutter. The weights are attached to cables 42 which are led over directional pulleys 43 and attached to short lengths of sprocket chain 44 which in turn are secured to and have driving engagement with sprockets 45 fixed upon one end of shafts 46 rotatably mounted in the machine frame 18. The other end of the shafts 46 have fixed thereon pinion gears 47 which in turn mesh with the teeth of segments 48 shown best in Fig. 13. Segments 48 are keyed to the shaft 32 and desirably are enclosed in casings 49 to exclude dirt, chips and all foreign matter from the mechanism. The weights 41 therefore, serve to urge the cutters into cutting relation with the blocks through the intermediary of the above described mechanism.

It should be pointed out in connection with this type of resilient motive power that a smooth and uniform cut is assured. Pressure of the cams upon the followers remains constant and moreover a still more important condition is maintained. The tendency of the cutter to bounce away from the block during the cutting operation is reduced to a minimum. The sudden application of the force of the cutting blades upon the block sets up a reactive force tending to move the cutters away from the cut. This tendency of the cutters to move away from the cut is resisted not alone by the steady pull of the weight but by a greater force set up by the inherent inertia of the weight. All reactive forces are snubbed out by the weights while the inward movement of the cutter head is effected by the pull of the weights due to gravity.

The follower rolls 37 have two sections, an outer section of small diameter and an inner section of large diameter, the latter of which engages the edge of the cam 38. The section of small diameter engages a shaped cam 50 which, like the cam 38, is rigidly secured to the cam support arm 39. The shaped cam 50 is provided with a curved working face 53 of a shape adapted to generate the desired heel curve or contour 30 resulting from the combined inward movement of the cutter and the transitional movement of the heel block in the cutting zone.

The various positions of one of the cutters 27 with respect to a heel block 31 and the various positions of the cooperating cams 50 and 38 with respect to the follower rolls 37, are illustrated in Figs. 9, 9—A, 9—B and 9—C in connection with a cutting cycle. In the operation of the apparatus as shown for example in Fig. 9, the carrier 20 moves in the direction of the arrow so as to bring the follower rolls 37 successively into contact with the cams 38 and 50. The engagement of the roll section of large diameter with the cam 38 causes the cutter to move outward with respect to the carrier and to bring it into a position for starting a cutting operation on a heel block. Fig. 9 illustrates the position of the cutter 27 at the end of a cutting operation on the cross-hatched heel block 31. It will be noted that the cutting line 30 has been formed from the breast corner around to the back line 36, and that the cam 38 has just moved into engagement with the large diameter portion of a succeeding follower roll 37. In this position, the curved edge 53 of the cam 50 still rests on the small diameter portion of the follower roll 37 opposite the cross-hatched block 31.

Fig. 9—A of the drawings shows the position of the elements shown in Fig. 9 after the cross-hatched block 31 has been moved substantially away from the cutter 27. It will be noted that in Fig. 9—A the large diameter portion of the only follower roll 37 now operating on the cutter arm, has moved along the inclined edge of the cam 38 to bring the cutter 27 out somewhat toward a position for starting the cutting operation on a new heel block 31. Fig. 9—B shows the position of the cutter and the cams just after the cutting operation on the heel block started. In this figure it will be noted that the follower roll 37, acting on the cam 38 in Fig. 9—A, has been moved to a position where the shaping cam 50 has taken over control by engaging the small diameter section of the follower roll. A subsequent stage in the cycle of cutting a heel block is shown in Fig. 9—C of the drawings, in which the cutter 27 is shown just around the back of the curve of the cutting line 30, while the follower roll 37 opposite the block 31, has moved substantially along the edge 53 of the pattern cam 50. The position at the completion of the cutting cycle is the same as in Fig. 9.

Shortly after the end of each cutting operation, a succeeding follower roll 37 engages the cam 38 to restore the cutter 27 to its initial position for starting a cutting operation on a new heel block. After one side of a heel block has been cut in the manner described above, the other side of the block is cut by a similar cycle of operation by the cutter on the other side of the carrier 20, which has its own cams for successive engagement with the spaced follower rolls 37 on the opposite side of the carrier 20.

For certain types of heels the above cycle of movement between cutters and blocks is sufficient to produce a satisfactory heel. For many other types of heels, however, it becomes necessary to introduce additional relative movement between the blocks and cutters. For example, in a relatively high heel, the shape of its top lift end varies substantially from its heel seat outline. To produce this desired heel contour the heel blocks are given a rocking motion while the cutters are in operation thereon. This rocking motion is placed under the control of a cam. By properly shaping the cam a desired shape may be imparted to the toplift end of the heel.

Figure 4:
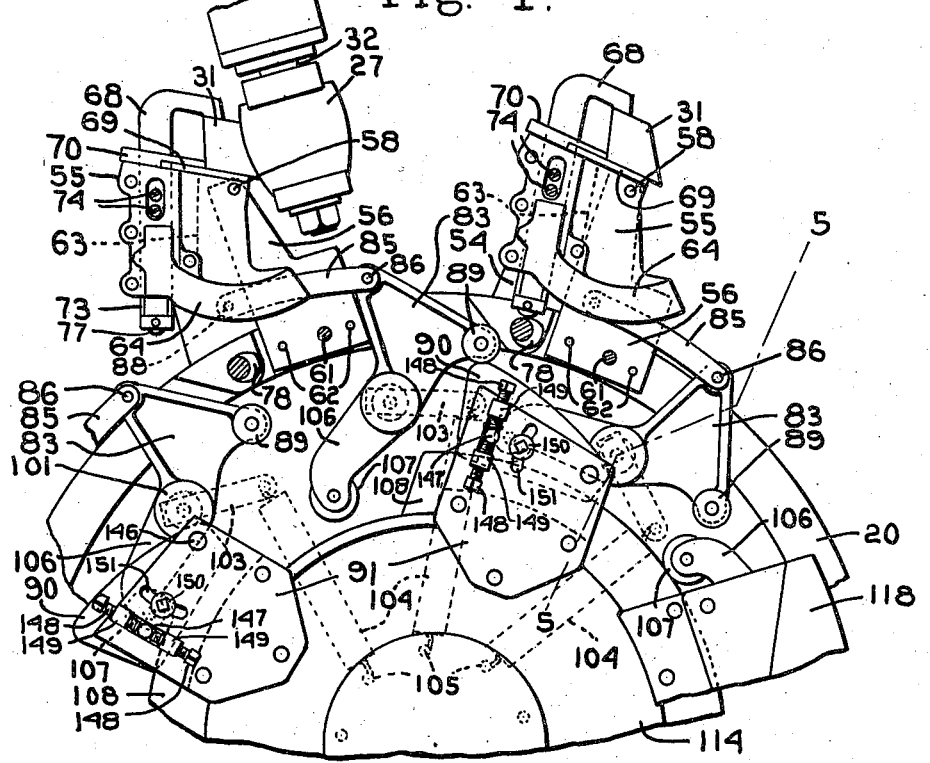
Fig. 4 is an enlarged detailed side view of a portion of the conveyor wheel illustrating the construction and operation of the means for rocking the heel block.

The heel blocks may be given this rocking motion in any suitable manner. The means for accomplishing this result as shown in the drawings constitutes a part of the invention. It is a very important consideration in developing and designing a machine of the type presented herewith to insure the maximum rigidity of all parts. Without rigidity the resulting vibrations cause rough unsatisfactory surfaces upon the heel. A mechanism for tilting the heel must therefore, be of such a nature as to maintain a firm and stable grip upon the block through the shaping operation. To accomplish the desired end the heel block jacks 19, as shown in Figs. 3 and 4, are made in two major sections a base section 54 and a movable block clamping section 55. The base section for structural reasons is best composed of three parts a central main supporting element 56 in the form of a flat plate having parallel nicely finished surfaces. The plate 56 projects outward from the periphery of the carrier wheel 20 and is provided with an aperture 57 (Fig. 3) within which a pivot pin 58 is received upon which the block clamping member 55 rocks. The plate 56 is rigidly anchored between the two sections 59 and 60 of the wheel 20. The two sections of the wheel are joined together by screws 61 which pass through apertures in the lower end of the plates 56. The plates 56 are held in perfectly true and fixed position by means of a pair of pins 62 to insure that the axis of the pins 58 will remain in accurately spaced relation about the wheel 20 and equally distant from its center.

Inasmuch as all of the jacks on the carrier 20 are identical it is deemed sufficient to describe only one. The movable section 55 of these jacks contains the block clamping element and has formed therein a central vertical slot 63 extending for a portion of its length from back to front and within which the plate 56 is received with a close but free fit against the sides of the plate. The slot is of sufficient extent to permit the member 55 to freely rock within the limits of the degree of motion required to produce any desired heel shape. At the lower portion of the member 55 its outer or side faces 64 are finished accurately flat and parallel to the plate 56.

Figure 5:
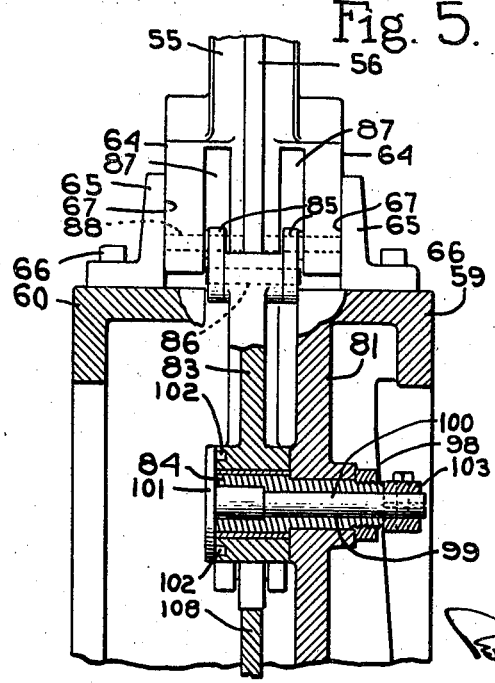
Fig. 5 is a cross section on line 5—5 of Fig. 4 showing in enlarged detail the construction and method of mounting the rocking lever for rocking the heel block.

As above suggested the base portion 54 of the jack is composed of three elements one of which is the plate 56 already described. The other two elements are in the form of angle plates 65 rigidly secured upon the periphery of the carrier 20 by means of screws 66 (Figs. 5 and 6). The inner faces 67 of the angle plates 65 are machined accurately flat and placed in contact with the faces 64 of the member 55. By supplying all of the interengaging faces between the members 54 and 55 with lubricant the member 55 is readily movable but is rigidly held against all movement other than that in a true plane parallel to the plane of movement of the carrier 20.

The heel blocks 31 are clamped in the member 55 by means of a clamp jaw 68 which engages the toplift end of the block. The heel seat end of the block rests upon the jack plate 69 which, as shown in Fig. 4, is provided with an adjustable breast gauge 70 which determines the back and front position of the block in the jack. An important feature of the jack construction is that which permits the jack plate 69 to be situated closely adjacent to the pivot pin 58. By thus positioning the jack plate, the rocking motion of the block has little effect upon the shape of its heel seat. However, it is possible to produce a maximum change in the toplift end of the heel which is the desired object of the rocking motion.

Block clamping pressure is derived from a pair of springs 71 (Fig. 6) which are received in chambers 72 formed in the member 55. The clamp jaw 68 extends downward into the member 55 and is telescopically received and clamped in a clamp actuating ram 73 guided to move vertically within the member 55. Desirably the ram is composed of two sections which are held together by screws 74 which clamp the two sections upon the jaw 68. Screws 74 pass through a vertical slot 75 in the member 68. When the screws are loosened the jaw member 68 may then be raised or lowered with respect to the ram to permit clamping heel blocks of various sizes in the jack. When the desired adjustment has been made the screws 74 are tightened.

The lower extremities of the ram sections are provided with lateral extension 76 against which the lower end of the springs 71 bear. The other end of the springs seat against the end walls of the apertures 72. The lower end of the ram 73 has rotatably mounted therein a roll 77 which is engaged by a cam 78 upon a cam shaft 79 extending laterally through and having a bearing in the carrier 20. The cam 78 and its actuating shaft 79 act to raise the clamping jaw 68 to release a processed heel and permit insertion of a rough block in the jack. The operation of the clamp releasing mechanism will be described hereinafter. To limit the downward travel of the ram 73 when no heel is in the jack a pair of bolts or screws 80 are provided. These screws pass through apertures in the ram extensions 76, project through the central apertures of the springs and are secured by screw threads in the end walls of the chambers 72. Screws 80 are of the correct length to permit free movement of the ram for all normal operations of the machine but prevent movement beyond that which is necessary by reason of the engagement of the extensions 76 with the heads of the screws. The screws 74 project into a slot in the member 55 (Figs. 4 and 5) thereby permitting free movement of the ram 73. Free access to the screws is this also permitted for the purpose of adjusting the position of the jaw 68.

It has been suggested hereinbefore that additional control of movement between the block and cutter should be provided to supplement that induced by the cam 50. To produce this added control automatic means are provided for tilting the heel blocks in timed relation to the progress of the cutters along the blocks. Any suitable mechanism may be employed for this purpose. A desirable means for accomplishing the required results is shown in Figs. 3 to 6 of the drawings wherein a link and lever mechanism is provided for each jack 19. Since all of these mechanisms are the same, only one will be described. Of the two sections 59 and 60 of the wheel 20, the section 59 is the main section and has a web 81 extending between its rim or peripheral portion and its hub 82. The hub is rigidly keyed to its drive shaft 21.

The section 55 of the jack which carries the block 31 is rocked by means of an actuating lever 83 fulcrumed upon a stud shaft 84 secured in the web 81 of the carrier 20. The lever 83 is connected to the jack element 55 by means of a pair of links 85 (Figs. 4 and 5) one end of each link being pivoted to the lever 83 upon a pivot pin 86. The links are mounted on opposite ends of the pin 86 anchored in the lever 83. The other ends of the links are received in slots 87 and pivoted upon pins 88 in the member 55. The lever 83 is provided with a cam roll 89 which engages a cam 90 having its active face developed to impart a predetermined desired motion to the block through the lever and the links 85. Two cams 90 are provided one of which acts to rock the blocks during the cutting of one side of the heel and the other being properly situated to actuate the rocking mechanism during the shaping of the other half of the heel as the carrier 20 moves through its operating cycle. The cams 90 are received upon cam plates 91 which in turn are rigidly mounted upon the periphery of a floating wheel 92 (Fig. 3). The wheel 92 is rotatably supported upon the hub 82 of the carrier 20 by means of a pair of ball bearings 93. The wheel 92, however, is held against rotation by means of a suitable anchoring member secured to a fixed element upon the machine. A convenient means for securing the wheel 92 is to provide an anchoring member 94 rigidly fastened to the wheel at one end and projecting laterally outward therefrom and secured at its other end to a casing or chip guard 95 which in turn is secured to the machine frame. To provide for accurate positioning of the wheel a short arcuate slot 96 is formed in the casing 95. A bolt 97 projecting from the anchor member 94 extends through the slot 96 and acts to lock the wheel in its correct angular position after it has been timed to cause proper synchronization of the rocking movement of the block with the action of the cutter head. Any other suitable arrangement for providing this adjustment may be utilized.

Means are provided for applying a resilient torque force to the lever 83 tending to rotate it in a clockwise direction as viewed in Fig. 4. This torque normally causes the clamping element 55 of the jacks to swing about its pivot 58 until the clamp jaw lift roll 77 engages the cam 78 where it is held at all times until the roll 89 engages the cams 90 during the heel shaping operation. Any suitable means may be provided for applying the required torque to the lever 83. As shown herein in Fig. 5 the stud shaft 84 is rigidly anchored in the web 81 by means of a nut 98 which draws a shoulder upon the shaft firmly against the web. The shaft 84 is provided with an axial bore 99 within which a torque shaft 100 is rotatably received. The shaft 100 is provided with a head 101 of substantially enlarged diameter. A pair of driving pins 102 project inward from the head and are received in apertures in the hub of the lever 83. The other end of the shaft 100 projects beyond the end of the stud shaft 84 and has fixedly secured thereto an arm 103. Upon the outer end of the arm 103 is secured one end of a tension spring 104 (Figs. 3 and 4), the other end of which is anchored upon a pin 105 fixed in the wheel web 81. The tendency therefore, is to rotate the lever at all times and the torque developed maintains the roll 89 firmly in engagement with the cams 90 during the shaping operation.

It should be noted in connection with rocking the block as above described that such action is more efficient than attempting to rock the cutter head to produce the same result for a very basic physical reason. A motor armature and spindle of considerable weight when rotated rapidly offer a very substantial resistance to a change in their axial position due to the gyratory action of the rapidly rotating elements. Such resistance to a change in axial position would interfere with the action of a mechanism tending to produce such a change. A practical mechanism for so moving the cutter would be extremely difficult to produce and its operation would be impractical.

As above stated automatic means are provided for releasing heel blocks from their jacks by lifting the jaws 68 against the clamping pressure of the springs 71 and that this action is accomplished by the cam 78 which engages the rolls 77. The manner of operating the cam 78 will be described hereinafter. It is evident that when block releasing pressure is applied to the roll 77 a very strong tendency of the roll to give way under the cam action is set up. The elements involved must therefore, be locked against movement at this time. A desirable means for accomplishing this end is illustrated in Figs. 4, 5 and 6 of the drawings wherein the lever 83 is provided with a rigid tail portion 106 in the lower end of which a roll 107 is rotatably mounted. A circular holding cam 108 is concentrically mounted upon the floating wheel 92 in position to be engaged by the roll 107. The position of the cam is such that lever 83 and the member 55 of the jack are held in their normal static position and the application of force upon the roll 77 by the cam 78 is resisted by the engagement of the roll 107 upon the cam 108 thus permitting the clamp jaws 68 to be raised without moving the member 55.

Since the holding cam 108 need function only during the ejecting and loading period of the machine cycle that portion of the cam which would engage the rolls 107 during the heel shaping operation is cut away to permit free rocking movement of the heel block holding members 55 which are at that time under the control of the cam 90. Directly after the roll 89 has reached the peak of the cam 90 the spring 104 acts to return the member 55 to its initial position. The two extremes of position of the member 55 are shown in Fig. 4. On the left it is shown in its position of maximum displacement at the completion of the cutting operation while on the right it is shown in its initial or neutral position.

Upon completion of the shaping of the heel the clamp jaw 68 is raised and held in raised position for sufficiently long a period of time to permit a processed heel to fall out and to permit the operator to insert a rough block. To accomplish this result the cam shaft 79 as shown in Figs. 6, 7 and 8 is extended outward beyond its bearings 109 and has secured thereon at one end an operating arm 110 and at its other end an operating arm 111. A cam roll 112 is rotatably mounted upon the outer end of the arm 111. The roll 112 projects into the groove of a cam 113. The cam groove is concentric with the axis of the wheel for a substantial portion of its length and is designed to manipulate the cam 78 by means of the arm 111. The cam 113 is fixed rigidly to the machine frame in any suitable manner as by securing it to a supporting member 114 which in turn is fastened to the bearing housing of the shaft 21 by means of screws 115. The position of the cam is so adjusted that the cam roll 112 will engage the angular face 116 thereof at position A at which time the shaft 79 and the cam 78 are rotated in a counter-clockwise direction as viewed in Fig. 8. When the roll 112 reaches the righ point of the face 116 the arm will then be disposed substantially radially from the axis of the shaft 21 and the roll will next engage the section 117 of the cam which will continue to rotate the arm 111 until it assumes the position shown at B at which time the high point of the cam 78 will have lifted the clamp jaw 68. This position of the parts will persist until the arm reaches the position C where its control is taken over by another and shorter cam 118 (Figs. 6 and 7). During the cycle of the machine represented by the travel of the arm 111 from the B to the C position a processed heel drops out and the operator inserts a rough blocks in the jack. To permit access to the jacks an opening 119 is formed in the casing 95 as shown in Fig. 1. The casing 95 is designed to cover a substantial portion of the carrier 20 bearing the jacks 19 which are in motion during the operation of the machine and which would subject the operator to the liability of injury from contact therewith.

A roll 120 rotatably mounted on the outer end of the arm 110 is at this time, as shown in Figs. 6 and 7, about to enter the groove of the cam 118. The arm 110 is so positioned upon the cam shaft 79 at this time that it assumes a position in advance of a radial line from the wheel axis and as its roll 120 enters the groove in the cam 118 it will engage the incline surface 121 of the cam which causes the arm 110 to rotate in a clockwise direction. Such movement of the arm 110 results in releasing the clamp jaw which then engages the unprocessed heel block placed therein by the operator. The action of the cam 118 and the arm 110 is shown graphically in Fig. 7 wherein the roll 120 is shown entering the cam groove in full lines and in dotted lines the positions are shown which it assumes as it traverses the cam. When the arm 110 has reached the position shown by the left hand dotted position the arm 111 and the roll 112 will be received in the groove of the cam 113. During the above series of operations the groove in the cam 113 is discontinued to permit the cam 118 to function. The roll 112 will then continue to traverse the concentric portion of the cam 113 until it again reaches the angular face 116 thereof from where the action is repeated.

To set up and adjust the machine to produce a specific heel, it is found desirable to provide for adjusting the cutter heads 27 into predetermined precise relationship with respect to the blocks 31. To provide for this adjustment, the motor bracket as shown in Figs. 11 and 12 is divided into three sections, a main supporting plate 122 having a pair of bosses 123 (Fig. 1) through which the shaft 32 passes and to which it is rigidly secured. An intermediate bracket member 124 is pivotally secured to the outer flat face of the supporting plate 122. The member 124 pivots upon a stud screw 125 rigidly secured in the plate 122. The screw is situated at the lower portion of the member 124 substantially on a level with the cutter 27. The upper edge of the member 124 has teeth formed therein to constitute a worm segment 126 on a radius the axis of which lies upon the axis of the screw 125. The upper end of the member 124 is held firmly against the member 122 and guided in its movement by a retaining member 127 having the general contour of the toothed segment. The member 127 is securely fastened to the plate 122 by screws 128 and is provided with a flange which overlies the member 124 and retains the two members in face to face contact.

To provide a readily operated means for obtaining accurate angular adjustment of the cutter heads a worm 129 is provided which meshes with the segment 126. The worm 129 is secured upon the end of a shaft 130 rotatably mounted in the member 127. The shaft 130 projects outward from the member 127 and is provided with a square end 131 upon which an operating handle or wrench not shown may be placed. To make the desired adjustment the worm is rotated until the correct angle is obtained at which time a pair of bolts 132 are tightened to lock the two elements 122 and 124 together. To provide for this adjustment the shanks of the bolts 132 pass through slots 133 in the member 122. A scale 134 on one or the other of the two elements and a pointer on the remaining element permits accurate recording of the adjustment. Once this adjustment has been made it will be only at rare intervals in the operation of the machine that a change will be required.

The third member 135 of the bracket 29 has vertical movement upon the member 124. The motor 28 having the cutter 27 upon its spindle is securely fixed upon the member 135. Vertical movement of the member 135 raises or lowers the cutter 27 thereby to adjust its vertical position with respect to the heel block 31. This adjustment may be necessary to establish cutting relation with the block at a predetermined portion of the blades of the cutter. This vertical adjustment is provided for by a dovetail slide connection 136. To simplify the vertical adjustment of the cutter a hand wheel 137 is provided secured to a vertical shaft 138 having a bearing in and held from axial movement within a bracket 139 mounted rigidly upon the member 124. The lower end of the shaft 138 has screw threaded engagement with the member 135. Rotation of the hand wheel 137 raises or lowers the motor and cutter. After correct adjustment has been made the two elements 124 and 135 are locked together by means of a screw 140 having threaded engagement with the member 135 and passing through a vertical slot 141 in the member 124. To lock the members the screw is rotated by means of a handle 142. Desirably a scale 143 is provided upon one of the two members having a cooperating indicator upon the other by means of which the position of the cutters may be recorded for future reference. Other suitable means may be employed for effecting the adjustment of the cutters. The means shown and described is only one desirable construction.

To produce heels of different sizes the cutter blades 144 (Fig. 11) in the cutter head 27 are adjusted to effect the desired size change in the manner customarily employed in the heel turning art. Another desirable adjustment is provided by means of which the contour and dimensions of the toplift end of the heel may be controlled. To accomplish this result the cams 99 are arranged in a manner to enable their effective contour to be changed in accordance with the desired results. A desirable construction for executing this adjustment is shown best in Fig. 4. The cams 99 are arranged to provide for raising or lowering the high end of the cams without substantially changing the effective height of their other end. It is unnecessary to provide special adjusting means to modify the curve along the side portions of the toplift end of the heel apart from the ordinarily provided means for initially setting up the machine to produce a given style. Once the style of this portion of the heel is established by the general contours of the cam and by the position of the cutter blades within the cutter head 27 it is unnecessary to make a further adjustment at the side portions of the heel. However, it is desirable to have available a means for adjusting the curve along the back of the toplift end since, in changing from size to size an undesirable distortion will in some cases appear at this portion of the heel. This distortion may be corrected by a slight rise or drop at the high end of the cam. This adjustment also provides a valuable means for establishing the correct slope of the cam at the time of the initial adjustment of the machine to insure precise coordination of the movement of the elements of the machine as created by the cams 50 and 90. Any suitable means may be provided for adjusting the pitch of the cams 90. As herein shown the cam is pivotally supported at its low end to the cam plate 91 upon a pivot screw 146. The other end of the cam is provided with a stud 147 rigidly anchored in the cam and projecting through and beyond the outer face of the plate 91. A pair of adjusting screws 147 are provided which engage the stud 147 respectively from its top and bottom extremities. The screws 148 are supported by and have screw threaded engagement in a pair of posts 149 rigidly fixed in the cam plate 91. Fine angular adjustment of the cam 90 is thus provided by rotating the screws 148 and when the exact position desired is determined a final turn of one screw will lock the parts in adjusted position. To rigidly secure the cam 90 upon the plate 91 a locking screw 150 is provided which passes through a vertical slot 151 in the plate and has threaded engagement with the cam. Tightening the screw 150 causes its head to firmly engage plate 91 and lock it to the cam 90.

To assist the operator to execute the initial adjustments on the machine a further desirable adjustment is provided which is shown in Fig. 9 wherein the shape cam 50 may be moved toward or from the carrier wheel 20. The cam 50 has formed therein a groove 152 extending substantially perpendicular to the plane 34 of the carrier 20 within which a boss 153 formed upon the arm 39 is received. The boss fits the groove snugly and the two elements are held in desired adjusted position by a clamp screw 154 the shank of which passes through a slot 155 in the cam. Adjustment in or out of the cam 50 can be made to effect the desired machine operation and the correct cam setting may be recorded by noting its position as indicated on the scale 156.

While the operation of the device will be apparent from its disclosure in connection with the above description, it may be of advantage to briefly restate the main operational features in their normal sequence. The operator is given a model heel bearing all the required characteristics of the heels to be produced upon the machine. Along with this model heel the operator is provided with the necessary number of cams 50 and 90 bearing the required curvature upon their active faces to produce the desired contours upon the heel. The cams are fitted into place and the cutter heads, which have been supplied with blades bearing the required profile, are adjusted into correct position with respect to the blocks. The machine is then ready to start upon a production run. After starting it the operator stands before the machine and places heel blocks into the heel jacks as they are successively moved into the loading station B by the constantly driven carrier wheel 20. Just prior to the loading operation, the clamping jaw 68 of each jack is automatically raised at which time a processed heel drops out of the jack after which the operator inserts an unprocessed block by placing it upon the jack plate 69 with its breast face engaging the breast gauge 70 and in a position laterally central of the jack. The clamp jaw 68 then descends and the block passes into the first cutting zone where one side of the heel is formed in the manner above described after which the final cut is made upon the other side of the block by the second cutter blade 27. Adjustments are made for different size heels in the same style in the manner above described and when a new style requires a different profile curve new cutter blades are installed in the cutter heads bearing the required contour, or the cutter heads are vertically adjusted to present a different portion of their cutting edge to the blocks.

I claim:

1. A heel shaping apparatus comprising a supporting frame, means on said frame for holding and translationally feeding heel blocks through a cutting zone at constant and uniform speed while confining the motion thereof to a single plane, a heel shaping tool, means for swinging said tool inward into cutting relation with the said blocks, pattern means for controlling and co-relating said inward swinging motion with said translational motion of the blocks to produce a predetermined heel shape, the inward path of travel of said tool having a predetermined course calculated to provide a predetermined speed of travel of the tool along the heel at the cutting line, and means to rock the heel block a limited amount in a plane substantially parallel to the heightwise axis of the heel being produced and to the plane of its path of travel further to control the heel shape.

2. A heel shaping machine comprising a supporting frame, a conveyor movable upon the frame, at least one heel block holding jack on said conveyor operable to receive and carry a heel block through a cutting zone, a heel shaping tool, a tool supporting arm pivoted upon said frame operable to move said tool into cutting relation with said heel block, a cam connected to said arm, a follower on said conveyor for each jack against which said cam is held during the shaping operation acting to control the swinging movement of the cutter to co-relate such movement with the feeding motion of said conveyor to produce a predetermined heel shape and means acting to rock said jack with respect to said conveyor under the control of a pattern means thereby further to control the shape of the heel.

3. A heel shaping apparatus comprising a supporting frame, a driven conveyor movable upon said frame, a plurality of heel block holding jacks secured to said conveyor having movable block clamping elements, a heel shaping tool, a supporting arm for said tool pivoted upon said frame operable to swing the tool in a plane substantially at right angles to the heightwise axis of the heel being produced and into cutting relation with the blocks carried by the jacks, means to coordinate the movement of the tool and the movement of the blocks to produce a predetermined heel shape, automatic means for rocking the said heel block clamping elements with respect to the jacks in a plane parallel to the heightwise axis of the heel and in timed relation to the movement of said tool, said automatic means including a cam fixed with respect to said frame and a follower for each jack engaged by said cam acting to rock said block clamping elements during the heel shaping operation thereby to introduce an additional controlling factor to vary the heel shape.

4. An automatic heel shaping apparatus comprising a frame, a conveyor supported by and movable upon said frame, means for driving said conveyor at uniform speed to feed heel blocks to and through a heel shaping zone, a rotary heel shaping tool, a tool supporting arm pivoted at one of its ends on said frame upon an axis substantially parallel to the heightwise axis of the heel being produced and having said tool mounted upon its other end, said arm acting to move said tool into heel shaping relation to the heel blocks, the axis of said pivot and said tool lying upon a plane extending outward away from said conveyor at an angle between 30° and 60° with respect to the plane of travel of the said heightwise heel axis, and means for co-relating the movement of said arm with the translational movement of the blocks during the shaping operations thereby to produce a predetermined heel shape.

5. An automatic heel shaping apparatus comprising a frame, a conveyor movably mounted on said frame, means for driving said conveyor at a uniform speed, a plurality of heel block holding jacks mounted upon said conveyor, a driven rotary heel shaping tool, a tool supporting arm pivoted at one of its ends on said frame upon an axis substantially parallel to the heightwise axis of the heels being produced and having said tool mounted upon its outer end, said arm acting to move said tool into heel shaping relation with said heel blocks as they are fed into shaping position by said conveyor, the axis of said pivot and said tool lying upon a plane extending outwardly from said conveyor at an angle between 30° and 60° with respect to the plane of travel of the said heightwise heel axis, a pattern cam fixed to said arm and a follower for each of said jacks mounted upon the carrier co-acting with said pattern cam to co-relate the swinging of said arm with the translational movement of the blocks during the shaping operation thereby to produce a predetermined heel shape.

6. An automatic heel shaping apparatus comprising a supporting frame, a conveyor mounted on the frame, a plurality of heel block holding jacks on said conveyor, block clamping means on said jacks operable to rock the jacks in a plane parallel with the plane in which the heightwise axis of the heels being produced travel, a rotary heel shaping tool, a tool supporting arm pivoted at one of its ends upon said frame upon an axis parallel to the heightwise axis of the heels being produced, said arm having a cutter mounted at its outer end whereby said tool may be swung into active engagement with the heel blocks as they are fed into the heel shaping zone, the axis of said arm and of said tool lying upon a plane extending outward away from said conveyor at an angle between 30° and 60° with respect to the said plane of travel of the heightwise heel axis, pattern means for co-relating the swing of said arm with the translational movement of the blocks during the shaping operation, and means co-acting with said pattern means for simultaneously rocking said block clamping means thereby to produce a predetermined heel shape.

7. An automatic heel turning apparatus comprising a frame, a conveyor movable upon said frame, means for driving said conveyor continuously and at uniform speed, a plurality of heel block holding jacks on said conveyor, each of said jacks including a pivoted block-clamping element, a heel shaping cutter, a cutter supporting arm pivoted at one of its ends upon said frame upon an axis substantially parallel to the heightwise axis of the heel being produced and having said cutter rotatably mounted upon its outer end, said arm acting to move said cutter into cutting relation with heel blocks carried by said jacks, controlling means for rocking said block-clamping elements in timed relation to the progress of the cutter along the heel blocks and in the plane of the bodily travel thereof, and pattern means for controlling the movement of the cutter arm during the cutting operation thereby to produce the desired heel contour, the pivot of said arm being situated substantially to one side of the line of movement of the heel blocks.

8. A heel shaping apparatus comprising a frame, a circular heel carrier rotatably mounted upon the frame, a plurality of heel block holding jacks mounted upon the periphery of said carrier having means to receive and feed rough heel blocks to and through a cutting zone, a cutter supporting arm pivoted upon said frame upon an axis substantially parallel to the heightwise axis of the heels being produced at said cutting zone and situated upon a plane extending outward from said cutting zone at an acute angle to the plane of the path of travel of the said heightwise axis of the heels a driven heel shaping cutter rotatably mounted upon the outer end of said arm, pattern means for controlling the swinging movement of said arm during the cutting operation to produce the desired heel shape, a second pattern means acting in timed relation to the action of the cutter to rock the heel blocks with respect to said carrier in a plane parallel to the plane of travel of the blocks during the heel shaping operation thereby further to control the heel shape.

9. An automatic heel shaping apparatus comprising a frame, a conveyor for holding and feeding rough heel blocks into and through a cutting zone, a power driven rotary heel shaping tool, a supporting arm upon which said tool is mounted pivoted upon said frame at one side of said conveyor and operable to swing said tool into working relation with said blocks at said cutting zone, pattern means for coordinating the movement of the cutter with the feeding movement of the blocks to produce the required heel shape, and weighted means connected to said arm acting to move the arm into its working position during the heel shaping operation.

10. An automatic heel shaping apparatus comprising the elements defined in claim 9 together with a pattern cam on said arm, and a follower connected to said conveyor co-acting with said cam to cause the movement of the arm to produce the desired heel shape.

11. An automatic heel shaping apparatus comprising a frame, a circular conveyor rotatably mounted on said frame, a plurality of heel block holding jacks mounted upon the periphery of said conveyor, a block clamping member for each jack pivoted to rock in an arc parallel to the plane of movement of the jacks, a lever for each clamping member pivoted on said conveyor and operably connected to the said block clamping means to rock them upon movement of the lever, a cam fixed with respect to said frame acting to engage said levers to rock said clamping members during the heel shaping operation, a pair of driven heel shaping cutters situated upon opposite sides of said conveyor acting to shape the opposite sides and back portions of the heel, a supporting arm for each cutter pivoted upon said frame and operable to swing the cutters into cutting position and pattern means acting together with said block rocking means to produce a predetermined heel shape.

12. An automatic heel shaping apparatus comprising the elements contained in claim 11 together with means for guiding said cutter to move in a path in a direction extending at an acute angle to the plane of travel of the heel blocks and substantially at right angles to the heightwise heel axis during the cutting operation.

13. An automatic heel shaping apparatus comprising a frame, a circular conveyor member rotatably mounted on said frame, a plurality of heel block holding jacks mounted on said conveyor said jacks having two major elements, a fixed element secured to the carrier and a block clamping element, means for pivoting said clamping element upon said fixed element to swing in a plane parallel to the plane of bodily travel of said jacks, relatively large flat inter-engaging areas upon said fixed element and said clamping element rigidly to guide the clamping element in its rocking movement, means on said conveyor for swinging said block-clamping element on its pivot in a plane parallel with said flat areas, power driven cutting means for shaping heels from said blocks, and pattern means for coordinating the movement of said cutters with the swinging movement of said clamping element thereby automatically to form the desired heel shape.

14. An automatic heel shaping apparatus comprising a frame, a carrier rotatably mounted on said frame, power means to rotate said carrier, a plurality of heel block holding jacks mounted upon the periphery of said carrier each of said jacks having a block clamping member pivoted to swing in a plane parallel to the radial plane of said carrier said carrier acting to feed the heel blocks continuously and at uniform speed during the heel shaping operation, a pair of power driven heel shaping cutters, a pair of supporting arms for said cutters arranged on opposite sides of said carrier and pivotally mounted on said frame operable to move said cutters into heel shaping position, cam means for controlling the movements of said arms during the heel shaping operation to produce a desired heel shape, block clamp manipulating means including a lever for each jack pivotally mounted on said carrier and having a connection acting to rock said block clamps upon movement of the lever, a pattern cam fixed with respect to said frame and engaged by said levers acting to rock said block clamp during the heel shaping operation thereby further to control the shape of the heel.

15. An automatic heel shaping apparatus comprising a frame, a carrier movably mounted upon said frame, power means to move said carrier at uniform speed, a plurality of heel block holding jacks mounted upon the carrier each jack having a block clamping member pivoted to swing in a plane extending in the direction of movement of said jacks, a pair of power driven heel shaping tools, a pair of supporting arms upon which said tools are mounted said arms being situated upon opposite sides of said carrier pivoted upon said frame and operable to move said tools into heel forming relation with the heel blocks carried by the carrier, cam means for controlling the movements of said arms during the heel forming operation to produce the desired heel shape, one of said tools acting to form one side of the heel and the other tool acting to form the opposite side of the heel, block clamp manipulating means including a lever for each jack pivotally mounted upon said conveyor and having a connection operable to rock said block clamp upon movement of said lever, a pattern cam fixed with respect to said frame and engaged by said levers which act to rock said block clamps during the heel shaping operation further to control the heel shape, means acting through said levers to lock said block clamps in their starting position and release them during the heel shaping operation, and automatic means acting to release a shaped heel from said clamps and permit an unfinished heel block to be inserted therein.

16. An automatic heel shaping apparatus comprising a frame, a circular carrier rotatably mounted on said frame, power means for rotating said carrier including a rigid drive shaft one end of which said carrier is secured, a plurality of heel block holding jacks mounted on the periphery of said carrier, each jack having a block clamp pivoted to swing in a plane parallel to the plane of the carrier, a pair of driven cutters for shaping the heel, a supporting arm for each cutter pivoted upon said frame upon opposite sides of said carrier, cam pattern means acting to control the movements of said arms to shape opposite sides and back portions of the heel to the desired shape, a cam supporting bearing axially mounted upon the hub of said carrier and a connection between said cam supporting bearing and said frame whereby said cam supporting bearing is held against rotation while permitting said carrier to rotate, a lever for each of said jacks mounted upon said carrier and having a connection operable to rock its respective block clamps, cams fixed on said cam supporting bearing engaged by said levers acting to rock the block clamps during the heel forming operation, a holding cam on said cam support bearing acting through said levers to lock said block clamps in their starting position and to release them during the cutting operation, said block clamp releasing means including an operating lever for each block clamp, and an annular cam generally concentric with the axis of said carrier and fixed to said frame acting through said cam releasing means to release the finished heel and permit insertion of a rough block in said clamping member.

17. An automatic heel shaping apparatus having the elements defined in claim 16 together with means for operating said block clamping means to permit it to grip and hold the block during the heel shaping operation including an auxiliary cam on said cam support bearing, a clamping jaw for engaging the heel block, and jaw operating means engaged by said auxiliary cam to release the jaw into clamping position prior to the heel forming operation.

18. An automatic heel shaping machine comprising a frame, a conveyor movable upon the frame, means to move the conveyor at a uniform speed, a plurality of heel block holding jacks on said conveyor each jack having a block clamping element pivoted to swing in a plane in the direction of movement of the jacks, a pair of power driven heel shaping tools, a supporting arm for each tool pivoted on said frame upon opposite sides of said conveyor operable to move said tools into cutting position with respect to the heel blocks to form respectively the opposite sides and back portion of the heel, pattern means acting during the cutting operation for controlling the movement of said arm to cause said tools to produce a heel of the desired shape, a control lever for each jack pivoted upon said carrier, a positive connection between said levers and said block clamps acting to transmit motion of said levers to said clamps, pattern cams acting to engage said levers during the cutting operation and to rock the heel block clamps during the heel shaping operation thereby further to control the shape of the heel, spring means acting yieldingly to maintain engagement between said levers and said cams, a clamping jaw on said block clamps having springs urging the jaw into clamping relation with said blocks, jaw lifting means for each jack having an actuating lever, cam means for engaging said jaw lifting lever acting upon completion of the heel shaping operation to release the completed heel, and a holding cam fixed with respect to said frame acting to engage and lock said control levers against movement thereby to hold said block clamps against rocking movement during the lifting of said clamp jaws.

19. An automatic heel shaping apparatus comprising a frame, a conveyor on said frame, means for driving said conveyor, a plurality of heel block holding jacks mounted on said conveyor, each jack including block-clamping members for receiving and holding heel blocks during the shaping operation, pivot pins for pivotally supporting said block clamping members, said pins being situated below and closely adjacent to the seat of the heels being produced and disposed to permit swinging said clamping members in a plane extending in the direction of motion of said jacks, a pair of driven heel shaping tools situated upon opposite sides of said conveyor, means for moving said tools into cutting relation with the blocks to perform the heel shaping operation, cam pattern means acting to rock said block clamping members about said pivot pins during the heel shaping operation further to control the heel shape.

20. A heel-shaping apparatus, comprising a frame, means for holding and feeding heel blocks through a cutting zone in a path confined to a plane and at a constant and uniform speed, a tool mounted on said frame for shaping the heel blocks, means for swinging the tool into cutting relation with the heel blocks as they pass through the cutting zone, pattern means mounted in fixed relation to said tool and adapted to be swung therewith, said pattern means acting to correlate the inward swinging motion of the tool toward the blocks in the cutting zone with the transitional motion of the heel blocks to produce a predetermined heel shape, and means cooperating with said swinging means for advancing the tool in the direction of movement of the block being cut in the cutting zone during the cutting of the back portion of the heel block.

21. A heel-shaping machine, comprising a supporting frame work, a conveyer movable upon said frame work, at least one jack on said conveyer for holding a heel block, said conveyor being arranged to advance said jack and a heel block held therein in a plane through a cutting zone at a constant and uniform speed, a heel-shaping tool supported on an arm pivoted upon said frame forward of the cutting zone and substantially to one side of said plane, said arm being arranged to swing in a plane substantially at right angles to the plane of travel of said jack and to move said tool into cutting relation with the heel block in said cutting zone, a cam connected to said arm, a follower on said conveyer for each jack against which said cam is held during the heel-shaping operation, said cam acting to correlate the swinging movement of the arm and of the tool thereon with the movement of the heel block through the cutting zone to generate a predetermined heel shape upon one-half of the heel block.

22. In an apparatus for shaping heels, including a frame, a conveyer for supporting and advancing heel blocks in succession through a cutting zone in a predetermined path, and a pair of cutters arranged to successively cut each block on its respective sides from the breast to the back line of the heel as the heel block advances through the cutting zone, the improvement which comprises means for mounting said cutters on said frame with one cutter on each side of said conveyor, and means for moving each cutter in the direction of movement of the heel block as the cutter moves around the back portion of the heel block.

23. In an automatic heel-turning machine, a frame, a conveyer movable upon said frame, means for driving said conveyer at a uniform speed, a plurality of jacks on said conveyer for holding heel blocks to be cut, a heel-shaping cutter supported on an arm having one end pivoted upon said frame upon an axis substantially parallel to the heightwise axis of the heel being cut by the cutter, said cutter being rotatably mounted upon the end of said arm opposite its pivot, said arm being adapted to swing said cutter into cutting relation with heel blocks carried by said jacks, the pivot of said arm being situated substantially to one side of the line of movement of said jacks, and said arm normally extending in a direction opposite to that of the movement of the jacks, whereby said cutter may be advanced in the direction of movement of the jacks during the cutting of the back portion of the heel blocks.

24. In an automatic apparatus for shaping heels, a frame, a conveyer on the frame having clamping means for holding a plurality of heel blocks in spaced relation, means for driving said conveyer to move said blocks at a uniform speed, a cutter for shaping said heel blocks mounted on a supporting arm pivoted to the frame upon an axis which is substantially parallel to the heightwise axis of the heel blocks at the cutting position, said arm extending generally alongside said conveyer from said pivot point in a direction opposite to the direction of movement of said heel blocks, said cutter being arranged to shape one side of each heel from the breast corner to the back line of the heel as the heel is moved by the conveyer relative to the pivot point of the arm, the pivot axis of said arm being situated a substantial distance to one side of the conveyer and from the line of movement of the heel blocks but less than the length of the arm supporting the cutter, whereby the cutter in moving around the back portion of the heel is adapted to move forward with the heel block and thereby increase the time available for cutting the back portion of the heel to the back line thereof.

25. In an apparatus for automatically shaping heels, a frame, a conveyor on said frame for supporting and advancing heel blocks in a given direction through a shaping zone, a rotary heel-shaping tool mounted on one end of an arm having its other end pivoted to the frame at one side of the conveyor and forward of said shaping zone in the direction of movement of the conveyor, said arm being adapted to swing said tool into heel-shaping relation to the heel blocks as they are advanced through said zone, the angle between said arm and the plane of movement of the heel blocks through the cutting zone being between 30° and 60°.

26. In an apparatus for automatically shaping heels, a frame, a conveyor on said frame for supporting and advancing heel blocks in a given direction through a shaping zone, a rotary heel-shaping tool mounted on one end of an arm having its other end pivoted to the frame at one side of the conveyor and forward of said shaping zone in the direction of movement of the conveyor, said arm being adapted to swing said tool into heel-shaping relation with the heel blocks as they are advanced breast first through said zone, the angle between said arm and the plane of movement of the heel blocks through the cutting zone being a substantial acute angle adapted to permit said tool to follow the heel block in cutting the back portion of the heel.

27. In an apparatus for automatically shaping heels, a frame, a circular conveyor rotatably mounted on said frame, a plurality of heel block clamping means mounted in spaced relation upon the periphery of the circular conveyor, a rotary heel-shaping tool mounted on one end of a supporting arm having its other end pivoted to the frame at one side of the periphery of the conveyer, said arm being pivoted on an axis which is approximately parallel to a radius of the conveyer at the position of the pivot, said arm extending from its pivot on the frame in a direction generally opposite to that of the rotation of the conveyer and at an angle of from 30° to 60° with respect to the plane of the conveyer.

28. In an apparatus for automatically shaping heels, a frame, a circular conveyor rotatably mounted on said frame, a plurality of heel block clamping means mounted in spaced relation upon the periphery of the circular conveyor, a rotary heel-shaping tool mounted on one end of a supporting arm having its other end pivoted to the frame substantially to one side of the periphery of the conveyer, said arm being pivoted on an axis adapted to position the axis of the tool approximately parallel to a radius of the conveyer at the position of the tool, said arm extending from its pivot on the frame in a direction generally opposite to that of the rotation of the conveyer and at an acute angle to the plane of the conveyer.

29. A heel-shaping machine, comprising a supporting frame-work, a conveyer movable upon said frame-work, at least one jack on said conveyer for holding a heel block, said conveyer being arranged to advance said jack and a heel block held therein in a plane through a cutting zone at a constant and uniform speed, a heel-shaping tool supported on an arm pivoted upon said frame forward of the cutting zone and substantially to one side of said plane, said arm being arranged to swing in a plane substantially at right angles to the plane of travel of said jack and to move said tool into cutting relation with the heel block in said cutting zone, a pattern cam and a tool-moving cam connected to said arm, a follower roll on said conveyer for each jack having a section of one diameter against which said pattern cam is held during the heel shaping operation, said roll having a section of larger diameter for engaging said tool-moving cam, said pattern cam being adapted to correlate the swinging movement of the arm and of the tool thereon with the movement of the heel block through the cutting zone to generate a predetermined heel shape upon one-half of the heel block, and said tool-moving cam being arranged to move the tool away from said plane following each heel-shaping operation.

GEORGE CLAUSING.